US008682983B2

United States Patent
Cassanova et al.

(10) Patent No.: US 8,682,983 B2
(45) Date of Patent: *Mar. 25, 2014

(54) SYSTEMS, METHODS AND COMPUTER PROGRAM PRODUCTS FOR THE DELIVERY OF EMAIL TEXT MESSAGES AND AUDIO VIDEO ATTACHMENTS TO AN IPTV DISPLAY DEVICE

(75) Inventors: Jeffrey Cassanova, Villa Rica, GA (US); N. Peter Hill, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 269 days.

This patent is subject to a terminal disclaimer.

(21) Appl. No.: 11/950,110

(22) Filed: Dec. 4, 2007

(65) Prior Publication Data

US 2009/0144379 A1   Jun. 4, 2009

(51) Int. Cl.
G06F 15/16 (2006.01)
(52) U.S. Cl.
USPC ............................ 709/206; 709/204; 709/207
(58) Field of Classification Search
USPC ........................................................ 709/206
See application file for complete search history.

(56) References Cited

U.S. PATENT DOCUMENTS

| 2002/0147988 | A1* | 10/2002 | Nakano .......................... 725/134 |
| 2004/0010808 | A1 | 1/2004 | deCarmo |
| 2004/0083271 | A1 | 4/2004 | Robert Tosey |
| 2004/0215736 | A1 | 10/2004 | Kortan et al. |
| 2005/0108348 | A1 | 5/2005 | Lee |
| 2006/0064700 | A1* | 3/2006 | Ludvig et al. ................. 719/318 |
| 2006/0179453 | A1* | 8/2006 | Kadie et al. ...................... 725/34 |
| 2006/0179466 | A1 | 8/2006 | Pearson et al. |
| 2006/0189330 | A1* | 8/2006 | Nelson et al. .................. 455/457 |
| 2007/0107019 | A1 | 5/2007 | Romano et al. |
| 2007/0112910 | A1 | 5/2007 | Skladman et al. |
| 2007/0115389 | A1 | 5/2007 | McCarthy et al. |
| 2007/0129056 | A1 | 6/2007 | Cheng et al. |
| 2007/0233751 | A1 | 10/2007 | Sampson |
| 2007/0233787 | A1* | 10/2007 | Pagan ........................... 709/206 |
| 2007/0297582 | A1 | 12/2007 | Tuli |
| 2008/0055427 | A1 | 3/2008 | Wendelrup |

(Continued)

FOREIGN PATENT DOCUMENTS

EP    0811939      12/1997
EP    1458195 A2   9/2004

(Continued)

OTHER PUBLICATIONS

International Search Report, PCT/US2008/083075, Mar. 5, 2009.
PCT Written Opinion, PCT/US2008/083075, Mar. 5, 2009.
PCT International Preliminary Report on Patentability and Written Opinion of the International Searching Authority for International Application No. PCT/US2008/08305, Jun. 17, 2010, 7 pages.

(Continued)

Primary Examiner — Shripal Khajuria
(74) Attorney, Agent, or Firm — Cantor Colburn LLP

(57) ABSTRACT

The present invention relates to a method for the delivery and display of an email text message and audio/video attachment to an IPTV enabled display device. The method comprises retrieving an email message and at least one audio/video attachment from an email account, and saving the email message and one audio/video attachment. The method further comprises analyzing the retrieved email message to determine if an IPTV account is associated with data that is comprised within the email message, and transmitting a notification to the IPTV account in the event that the email data that is comprised within the email message is determined to be associated with the IPTV account.

6 Claims, 7 Drawing Sheets

(56) References Cited

U.S. PATENT DOCUMENTS

| | | | |
|---|---|---|---|
| 2008/0065652 A1 | 3/2008 | McCann et al. | |
| 2008/0215687 A1* | 9/2008 | Madnani ..................... | 709/206 |
| 2009/0144378 A1 | 6/2009 | Cassanova et al. | |
| 2009/0150903 A1 | 6/2009 | Cassanova et al. | |

FOREIGN PATENT DOCUMENTS

| | | | |
|---|---|---|---|
| WO | 0044173 | A1 | 7/2000 |
| WO | 2006083492 | A2 | 8/2006 |
| WO | 2007047036 | A2 | 4/2007 |

OTHER PUBLICATIONS

PCT International Preliminary Report on Patentability and Written Opinion of the International Searching Authority for International Application No. PCT/US2008/082933, Jun. 17, 2010, 12 pages.
International Search Report, PCT/US2008/082933, Jan. 20, 2009.
International Search Report, PCT/US2008/083149, Feb. 16, 2009.
PCT: Notification Concerning Transmittal of International Preliminary Report on Patentability and Written Opinion of the International Searching Authority; International Application No. PCT/US2008/083149; International Filing Date: Nov. 12, 2008; Date Mailed: Jun. 17, 2010; 8 pages.

* cited by examiner

SYSTEMS, METHODS AND COMPUTER PROGRAM PRODUCTS FOR THE DELIVERY OF EMAIL TEXT MESSAGES AND AUDIO VIDEO ATTACHMENTS TO AN IPTV DISPLAY DEVICE

BACKGROUND OF THE INVENTION

1. Field of the Invention

This invention relates to the field of network communication transmissions, and particularly to the field of network communication transmissions within networks that support Internet protocol television services.

2. Description of Background

Internet protocol television (IPTV) is a digital television delivery service wherein the digital television signal is delivered to residential users via a computer network infrastructure using the Internet Protocol. Typically, IPTV services are bundled with additional Internet services such as Internet web access and voice over Internet protocol (VOIP). A requirement for a user to playback IPTV operations is that a user has a set top box connected to their television for the reception of a digital signal. Used in conjunction with an IP-based platform, a set top box allows for a user to access an IPTV service and any additional services that are integrated within the IPTV service.

IPTV service platforms allow for an increase in the interactive services that can be provided to residential user. As such, a user can have access to a wide variety of content that is available via the IPTV service or the Internet. For example, a user may utilize a set top box to view IPTV content or access their personal electronic messaging accounts via an Internet web browser. However, while viewing IPTV content a user may desire to be notified in real-time of any messages that they may have received.

Therefore, there exists a need for a solution that would allow an IPTV user to be notified of and access personal electronic messages that have been forwarded to the IPTV user while the user views IPTV content.

SUMMARY OF THE INVENTION

The limitations of the prior art are overcome and additional advantages are provided through the provision of a method for the delivery and display of an email text message to an IPTV enabled display device. The method comprises retrieving an email message and at least one audio/video attachment from an email account, and saving the email message and one audio/video attachment. The method further comprises analyzing the retrieved email message to determine if an IPTV account is associated with data that is comprised within the email message, and transmitting a notification to the IPTV account in the event that the email data that is comprised within the email message is determined to be associated with the IPTV account.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art. In reference to the drawings, like numbers will indicate like parts continuously throughout the views.

Exemplary embodiments include systems and methods for receiving within an IPTV environment an email message—in addition to any image (e.g., JPEG, BMP, TIFF, etc.), or audio/video container file attachments (e.g., IFF, AVI, MOV, etc.), to the message—from a remote communication device (e.g., a cell phone, networked PDA or portable computer, etc.), for interaction and display within the IPTV environment. Aspects of the present invention comprise the architecture of an IPTV gateway, wherein the IPTV gateway is responsible for retrieving email messages that have been sent to an IPTV subscriber and providing notification of the reception of the email message to the IPTV subscriber at a display device. A notification can be in the form a "pop-up" display window displayed at a display device or any other conventional message notification scheme. Further, the IPTV gateway presents a history of the notifications to the IPTV subscriber, in accordance with exemplary embodiments.

Within aspects of embodiments of the present invention the IPTV gateway interfaces with a POP3 infrastructure in order to retrieve email messages that have been directed to an IPTV subscriber. Additionally, the gateway interfaces with a Preference server, wherein the Preference server is responsible for handling the performance preferences for an IPTV system as dictated by the desires of an IPTV subscriber. Further, the IPTV gateway is responsible for retrieving an IPTV subscriber's preferences for each IPTV set top box (STB) that is associated with the IPTV subscriber.

For each STB that is configured to retrieve email message information, the IPTV gateway interacts with an IPTV infrastructure to accomplish the actual transmittal of the email message to the requesting STB. Further, all email notifications that are generated within the system can be saved to a log at the IPTV gateway. As a further feature, IPTV subscribers can view a listing of the received email message log on their display device via an application that runs on the STB that is in communication with the display device.

Figure 1:
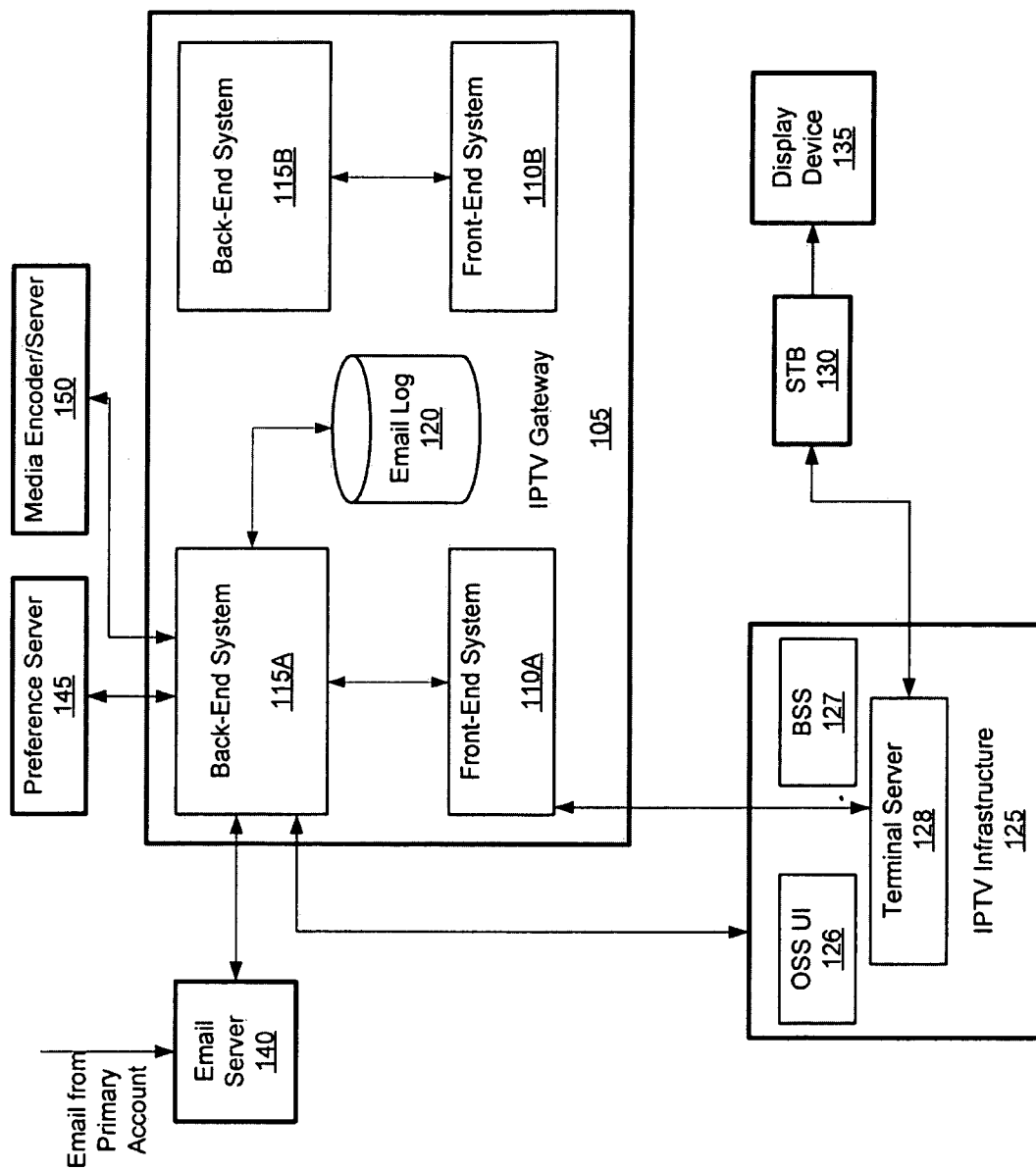
FIG. 1 illustrates aspects of a system that may be implemented within embodiments of the present invention.

Turning to the drawings in greater detail, it will be seen that FIG. 1 illustrates aspects of a system for the delivery of email messages within an IPTV environment that may be implemented within embodiments of the present invention. As illustrated in FIG. 1, the system comprises an IPTV gateway 105, wherein the IPTV gateway 105 further comprises a primary front-end processing system 110A that is in communication with a primary back-end processing system 115A. The primary back-end processing system 115A is in further communication with a database memory device 120. Within further exemplary aspects of the present invention a redundant secondary front-end 110B and a back-end processing system 115B are incorporated within the IPTV gateway 105. Within exemplary embodiments, the secondary front-end 110B and back-end 115B processing systems are configured to be operational only in the event of the failure of the primary processing system (110A, 115A) that corresponds to the secondary processing system (110B, 115B). The back-end processing systems (110A, 110B) further comprise an image analyzation component (not shown), wherein the image analyzation component can be implemented to identify and analyze the contents of an attached image or audio video file. As such, the image analysis component is configured to analyze an image according to system user specified pattern matching and pattern recognition criteria (e.g., within further exemplary embodiments of the present invention the image analyzation component can be used to perform facial recognition operations for human subjects that have been identified within an image or object identification and analysis operations for objects that have been identified within an image).

The back-end processing system 115A of the IPTV gateway 105 is interfaced with a media encoder server 150 and a Preference server 145. Within exemplary embodiments, the Preference server 145 is configured to handle the IPTV system performance preferences that have been selected by an IPTV subscriber. The back-end processing system 115A of the IPTV gateway 105 is also interfaced with a POP3 infrastructure—an email server 140. In operation, the email server 140 can be further networked with a PSTN network and a SS7 network (not shown) such that email messages that are received from remote communication devices initially are received at the SS7 network and thereafter routed to the email server 140.

The back-end processing system 115A of the IPTV gateway 105 is further interfaced with an IPTV processing infrastructure 125. The IPTV processing infrastructure 125 can comprise an operation support system (OSS) user interface component 126, a business support system component 127, and a terminal server 128. The IPTV processing infrastructure 125 is in further communication with a STB 130, wherein the STB 130 delivers received data to a display device 135.

Figure 2:
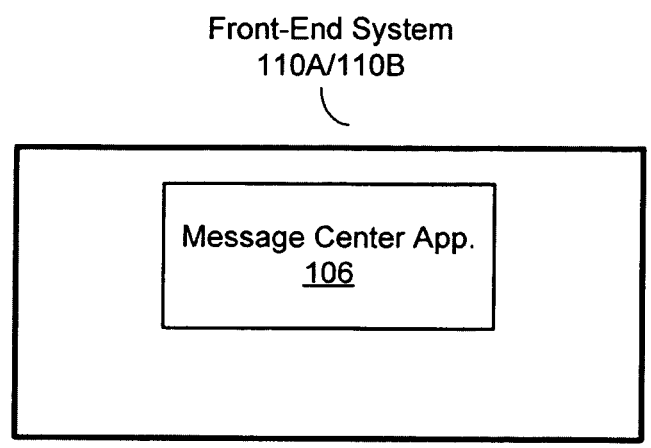
FIG. 2 illustrates aspects of a front-end processing system that may be implemented within embodiments of the present invention.
Figure 3:
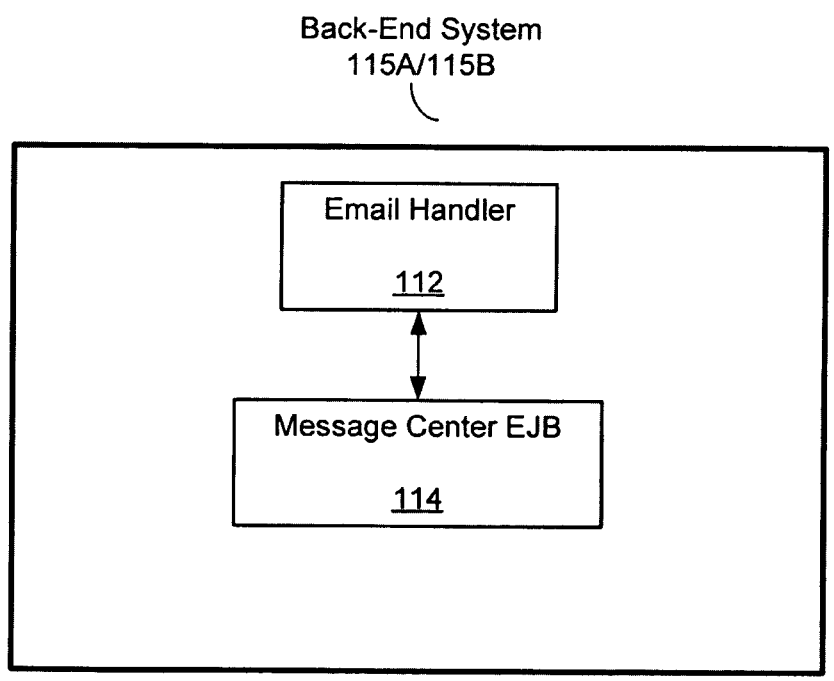
FIG. 3 illustrates aspects of a back-end processing system that may be implemented within embodiments of the present invention.

As seen in FIG. 2, the front-end processing systems (110A, 110B) further comprise a message center application 106. The message center application 106 is in communication with a message center enterprise Java bean (EJB) 114 and an email handler 112 (FIG. 3) that are comprised within the back-end processing system (115A, 115B). The IPTV processing infrastructure 125 is provisioned with IPTV subscriber user account numbers and STB device 130 identifiers. Within aspects of the present invention, the IPTV gateway 105 comprises a telephone number-to-account number mapping component, wherein a provisioned telephone number correlates to the IPTV subscriber's primary household telephone number. The IPTV subscriber's telephone number is further associated with the IPTV subscriber's email address. Further, the telephone number and email address can be linked with the subscriber's IPTV account number through a web-provisioning interface that is available within the IPTV gateway 105. Within exemplary embodiments, the IPTV gateway 105 has the ability to retrieve email messages and any image or audio/video attachments to the message, wherein the messages and the attachments are displayed as notifications on the display device 135 that is attached to the IPTV STB 130.

Initially, an IPTV subscriber is provisioned a primary email account. The email account may be associated with the telephone number of the IPTV subscriber's primary household telephone number (e.g., the local part of the subscriber's email address can comprise the primary household telephone number). In accordance with exemplary embodiments, the primary email account is configured to auto-forward all received email messages to a secondary email account that is serviced by the email server 140. After being forwarded to the secondary email account, the email message can be configured to be deleted from the sending primary email account.

At predetermined time intervals, the back-end processing system 115A periodically polls the email server 140 to ascertain if the email server has received any new email messages. In operation the back-end processing system 115A of the IPTV gateway 105 comprises a POP3 reader thread, wherein the POP3 reader thread is configured to periodically read a POP3 mailbox that has been configured to receive IPTV email messages. In the event that new email messages have been received at the email server 140, the back-end processing system 115A retrieves the new email messages from the email server 140. For each retrieved email message, the back-end processing system 115A may save the text of the email message, and if attached, the first image file attachment to an email log at the database memory device 120. Within exemplary embodiments, a primary operation of the IPTV gateway 105 is to transmit a notification to an IPTV subscriber's STB 130 that an email message has been sent to them. The IPTV gateway 105 may store the received email message information, thus allowing the IPTV subscriber to retrieve the email message information at a later time period with the use of the message center application 106.

For each retrieved email message, the back-end processing system 115A threads off an email thread to process the email message. Initially, the local part of the information that is contained within the "TO:" header of the email message may be retrieved. Within exemplary embodiments, the retrieved destination information is subsequently utilized to query the provisioning data to determine if an IPTV subscriber account ID is associated with the provisioning data. Next, the email thread looks for the text portion of the email message and determines if an audio or video attachment is present.

Thereafter, the email thread saves the text of the email message (and the audio/video attachment if present) to the email log 120. The audio or video attachments may also be copied to the message center application 106 of the front-end processing system 110A. Thereafter, the gateway 102 sends a notification to the subscriber's IPTV account indicating that the sender has sent an email message to the IPTV subscriber, in accordance with exemplary embodiments. The notification may further indicate that the IPTV subscriber must open the message center application 106 in order to access and view the email message and any images or audio/video attachments that may be present.

The front-end processing system's message center application 106 is used to store and make available information regarding the email log. When executed the message center application 106 may present an IPTV of subscriber with a list email message logs. For example, the message center application 106 displays the type of log, date/time that the log was recorded, and the party that generated the log.

Using a remote control device that is configured to operate in conjunction with the IPTV STB 130, a user may highlight a particular email message log using the remote control device. Upon selecting an email message, the user is presented at the display device 135 with a display window showing the text of the email message, in accordance with exemplary embodiments. In the event that a video file is attached to the email message, a still image from the video is displayed to the user. As part of the user interface, the user is also presented with the option of viewing the complete video in a succeeding display window. Likewise, in the event that an audio file is attached to the email message, a short sound clip from that message is played for user. As part of the user interface, the user is also presented with the option of hearing the complete audio in a succeeding display window.

Within exemplary embodiments, the message center 106 of the front-end processing system 110A is configured to respectively maintain Java Server Pages (JSPs), HTML, and client side JavaScript components. The back-end processing system 115A can be used to maintain email message data as well as the components that enable access to the email message data via the email message log 120. The message center application 106 operations are initiated and accomplished as follows. A subscriber initiates the message center application 106 from the STB 130 via a connection to the terminal server 128. A message center application 106 URL on the terminal server 128 points to a particular HTML address at the front-end processing system 110A of the IPTV gateway 105, within exemplary embodiments. The IPTV terminal server 128 is configured to send the account number of the IPTV subscriber as a parameter to the request. When the terminal server 128 tries to load a first HTML page that has been received from the message center application 106, JavaScript commands check to make sure the "account" parameter is present. If the "account" parameter is not present, an error page instructing the user to contact IPTV support may be displayed to the user instead of the email message logs.

In the event that the account parameter is available, the JavaScript function makes a query to a JSP on the front-end processing system 110A passing the account argument. The JSP then makes an EJB call to the back-end processing system 115A via the message center EJBs 114 communicating with the message center application 106. In the event that the call to the message center EJB 114 fails, then an error message may be returned instructing the subscriber to try again later. In the event that the message center EJB 114 does not fail, then an XML document is returned via the message center EJB 114, the XML document being passed back to the JavaScript function of the message center application 106, in accordance with exemplary embodiments. Lastly, the JavaScript completes the building of the webpage for display at the display device 135 by reading the XML document and formatting the HTML as necessary.

Figure 4:
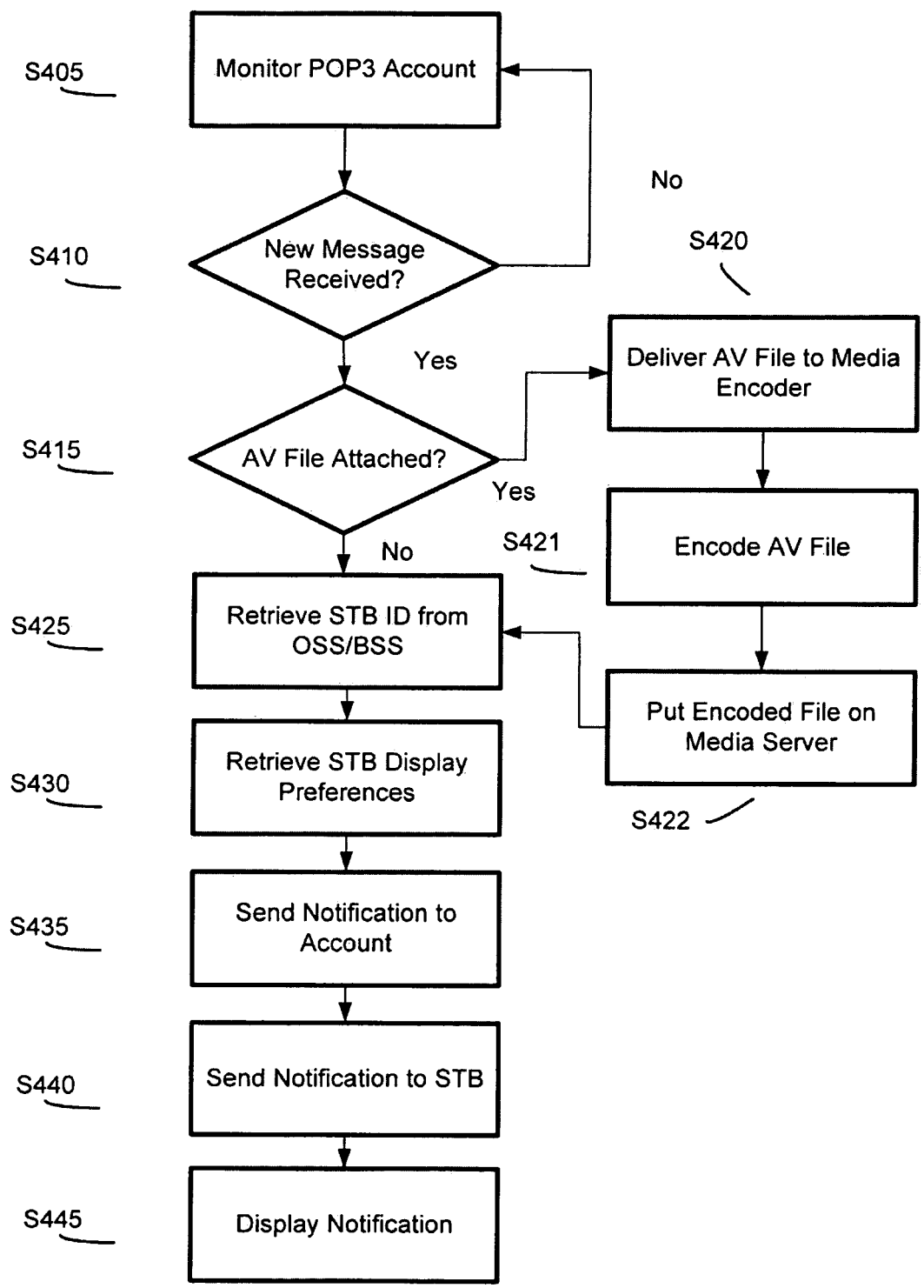
FIG. 4 is a flow diagram detailing aspects of a methodology for email message notification in an IPTV environment.

A methodology for generating a notification for an incoming email message is detailed in FIG. 4. At step 405 the back-end processing system 115A periodically polls the email server 140 to determine if the email server 140 has received any new email messages (step 410). If no new messages are detected then the back-end processing system 115A will resume polling the email server 140 at predetermined time intervals. If the back-end processing system 115A determines that new email messages currently reside on the email server 140, then at step 415 a determination is made as to if there are audio/video files attached to the email message. If an audio/video attachment is found, then the audio/video file is delivered to the media encoder for further processing to a useable media format (e.g., .wav to .asf) (steps 420 and 421). Then at step 422, the audio/video file is put on the media server.

Next, at step 425 the STB ID for each STB 130 that is associated with the IPTV subscriber's IPTV account is retrieved from the IPTV processing infrastructure 125 and returned to the back-end processing system 115A. At step 430, the display preferences for each STB 130 are retrieved from the Preference server 145 and delivered to the back-end processing system 115A. Thereafter, at step 435, a new message notification is transmitted for each STB 130 from the back-end processing system 110A to the IPTV processing infrastructure 125. At step 440, each respective notification is transmitted to the STB 130. Lastly, at step 445, the new message notification is displayed at the respective display device 135 that is in communication with a STB 130.

Figure 5:
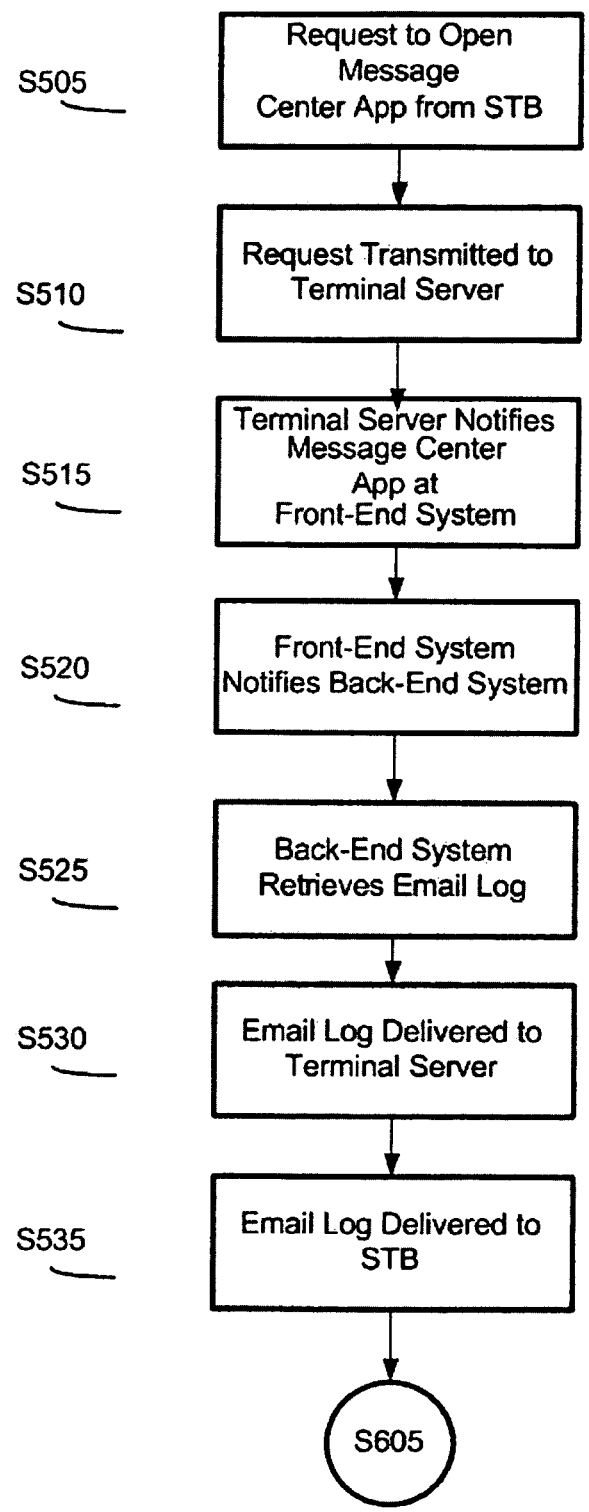
FIGS. 5 and 6 are flow diagrams detailing aspects of a methodology for email message and audio/visual attachment delivery in an IPTV environment.
Figure 6:
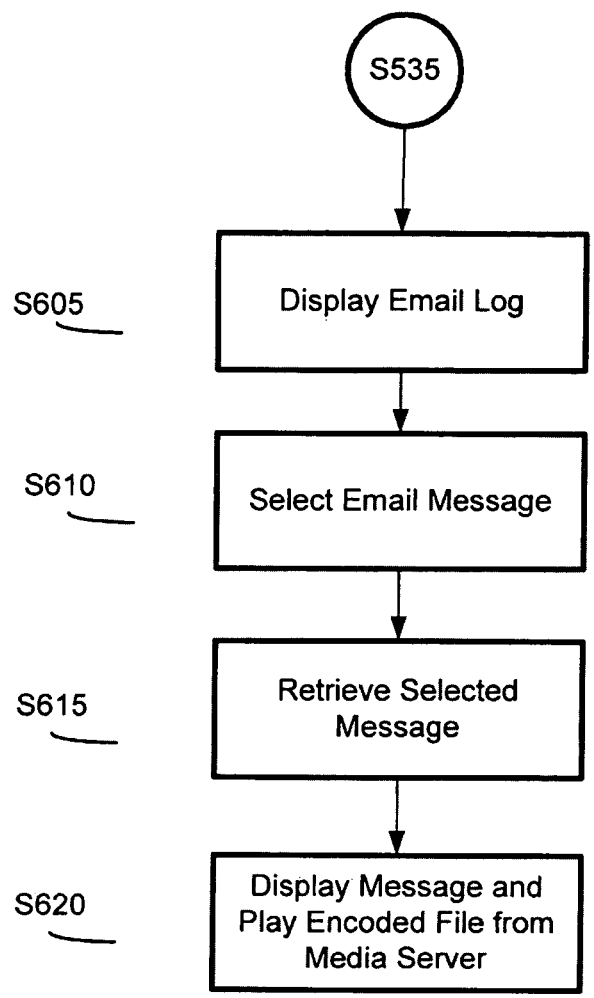

FIGS. 5 and 6 show flow diagrams that detail a method for the retrieval and display of an email message within an IPTV environment. At step 505, a request to view an email log is transmitted from the STB 130 to the message center application 106 via the IPTV processing infrastructure 125 (steps 510, 515). At step 520, the front-end processing system 110A notifies the back-end processing system 115A of the request. Thereafter, at step 525, the back-end processing system 115A retrieves the email log listing stored at the database 120. At step 530, the email log listing delivered to the terminal server 128 of the IPTV processing infrastructure 125, which delivers the email log listing to the requesting STB 130.

At step 605, the email log listing is displayed to a user at a display device 135. The user selects an email message that she wants to view from the listing using a remote control device (step 610). Upon selecting an email message, at step 610, the selected email message is retrieved from the database 120 by the back-end processing system 115A and the any attached audio/video URLs are retrieved from the front-end processing system 110A (step 615), thereinafter the audio/video file is put on the media server 150. The message and any files are delivered to the display device 135 wherein the message and file can be selected for display at a user interface (steps 620). The audio/video file can additionally be played via the STB connecting to the URL that is associated with that log entry.

Figure 7:
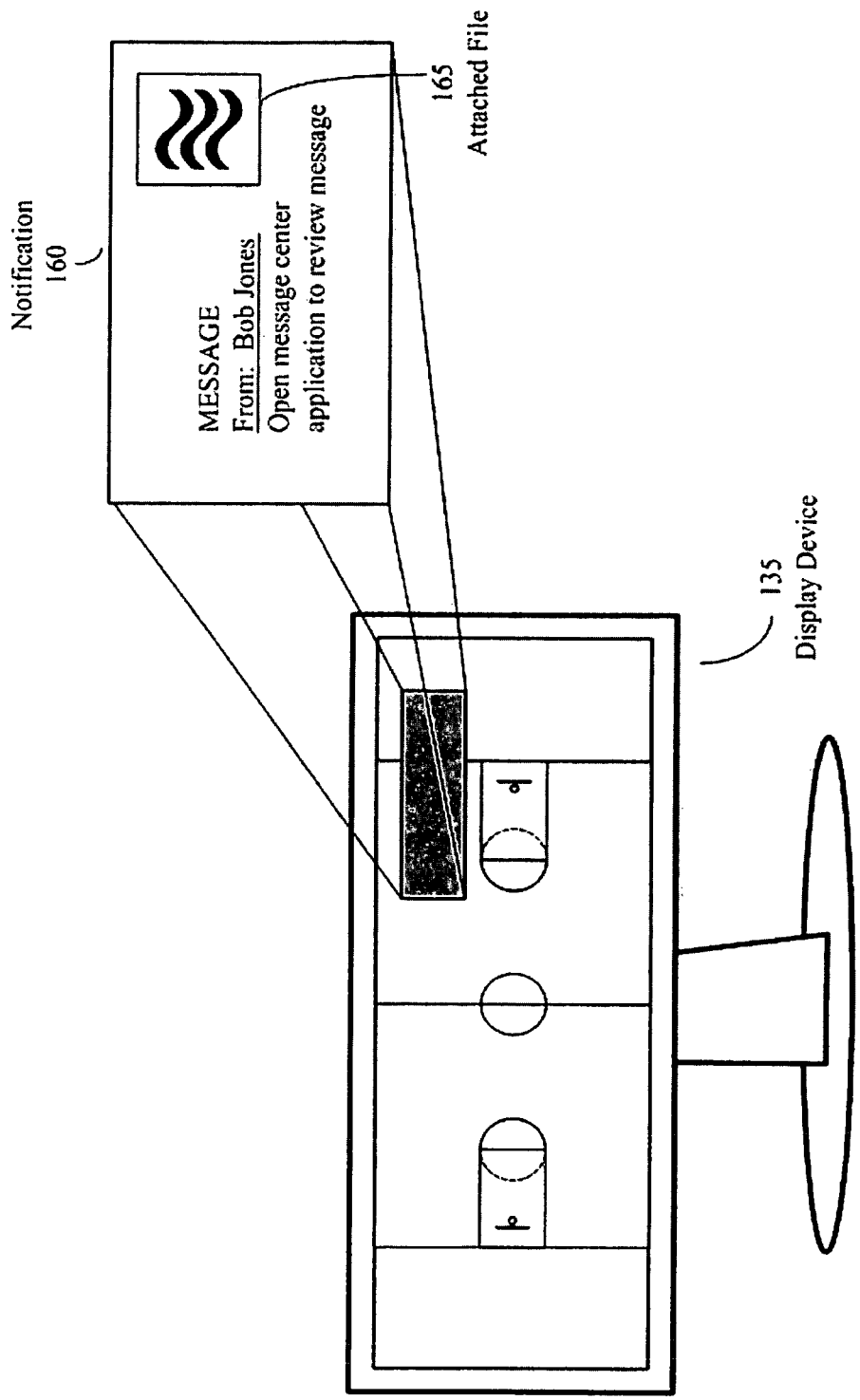
FIG. 7 is a diagram illustrating a display device and a notification message displayed on the display device in accordance with exemplary embodiments of the present invention.

FIG. 7 is an exemplary illustration of a message notification 160 that is displayed upon a display device 135. As shown, details included within the notification can include the message sender's name and instructions showing how to retrieve the message. The notification can also include an icon 165 indicating that the message also has a file that is attached to the message (wherein within exemplary embodiments the icon can comprise an image that is comprised within the attachment or an icon that is associated with the attachment file type). Within exemplary embodiments of the invention, the notification message 160 can be configured to be displayed until a user accesses the sent message or be displayed for a predetermined time interval—the user notification display preferences being delivered to and saved at the preference server 145.

Figure 8:
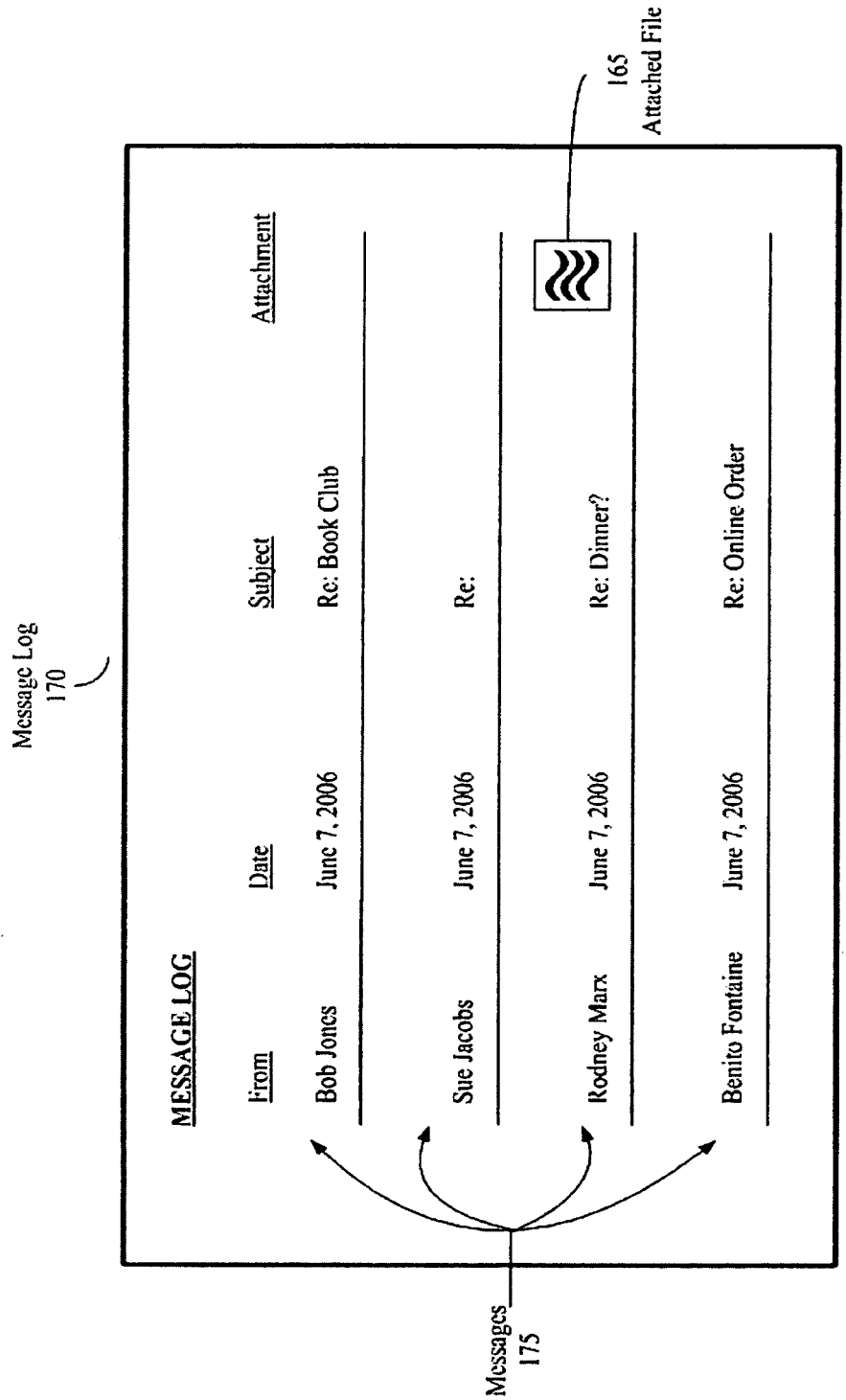
FIG. 8 is a diagram illustrating a received message notification log in accordance with exemplary embodiments of the present invention.

FIG. 8 is an exemplary illustration of a received email message log listing 170 comprising a listing of received messages 175 that are available for retrieval from the message log 120. As shown, the message log listing 170 can comprises a listing of the messages 175 that have been retrieved from the email server 140. The message log listing 170 can show the sender for each retrieved message 175 in addition to the date the message 175 was sent, the subject of the message 175— and in the event that the message 175 has an attachment—an icon 165 indicating that a file is attached to a message 175 can also be displayed at the message log listing 170.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments tailing within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed is:

1. A method for delivery of an email message and an audio/video attachment to an internet protocol television enabled display device, the method comprising:
    receiving at a back-end processing system of an internet protocol television gateway the email message and the audio/video attachment from an email account, the back-end processing system in communication with a preference server storing user notification display preferences, the back-end processing system applying the user notification display preferences to the email message, the user notification display preferences identifying preferences for a duration of a notification message, wherein the user notification display preferences are used to configure the notification message to be displayed for a predetermined time interval;
    saving the email message and the audio/video attachment, wherein saving the audio/video attachment includes encoding the audio/video attachment using a media encoder to convert the audio/video attachment to a useable format;
    analyzing the email message to determine if an internet protocol television account is associated with data within the email message;
    determining a plurality of set top box identifiers, the set top box identifiers being associated with the internet protocol television account; and
    transmitting through a front-end processing system of the internet protocol television gateway a notification to set top boxes corresponding to the set top box identifiers associated with the internet protocol television account in the event that the data within the email message is determined to be associated with the internet protocol television account;
    wherein the back-end processing system performs image analysis to identify and analyze the contents of the audio/video attachment according to user specified pattern matching and pattern recognition criteria.

2. The method of claim 1, wherein for each email message that is retrieved from the email account, text of the email message is saved to an email log.

3. The method of claim 1, wherein analyzing the email message to determine if an internet protocol television account is associated with the data within the email message comprises analyzing a destination header of the email message in order to retrieve an internet protocol television account identifier.

4. The method of claim 1, further comprising accessing the notification message via an internet protocol television set top box, wherein the notification message is displayed on a display device that is in communication with the internet protocol television set top box.

5. A non-transitory computer-readable medium for delivery of an email message and an audio/video attachment, the non-transitory computer-readable medium comprising a computer program product having instructions thereon, the instructions comprising:
    receiving at a back-end processing system of an internet protocol television gateway the email message and the audio/video attachment from an email account, the back-end processing system in communication with a preference server, the back-end processing system applying user notification display preferences to the email message, the user notification display preferences identifying preferences for a duration of a notification message, wherein the user notification display preferences are used to configure the notification message to be displayed for a predetermined time interval;
    saving the email message and the audio/video attachment, wherein saving the audio/video attachment includes encoding the audio/video attachment using a media encoder to convert the audio/video attachment to a useable format;
    analyzing the email message to determine if an internet protocol television account is associated with data within the email message;
    determining a plurality of set top box identifiers, the set top box identifiers being associated with the internet protocol television account: and
    transmitting through a front-end processing system of the internet protocol television gateway a notification to set top boxes corresponding to the set top box identifiers associated with the internet protocol television account in the event that the data within the email message is determined to be associated with the internet protocol television account;
    wherein the back-end processing system performs image analysis to identify and analyze contents of the audio/video attachment according to user specified pattern matching and pattern recognition criteria.

6. The computer program product of claim 5, further comprising analyzing each email message to determine if an internet protocol television account is associated with the data within the email message, the analyzing comprises analyzing a destination header of the email message in order to retrieve an internet protocol television account identifier.

* * * * *